United States Patent [19]
Schlossers et al.

[11] Patent Number: 5,557,685
[45] Date of Patent: Sep. 17, 1996

[54] PROCESS AND DEVICE FOR DETERMINING THE LOCATION OF A TARGET

[75] Inventors: Christophe Schlossers, Chatillon; Stéphane Burzawa, Versailles; François Megel, Chaville; Anne Le Gouzouguec, Vanves, all of France

[73] Assignee: Aerospatiale Societe Nationale Industrielle, Paris, France

[21] Appl. No.: 569,556

[22] Filed: Dec. 8, 1995

Related U.S. Application Data

[63] Continuation of Ser. No. 257,915, Jun. 10, 1994, abandoned.

[30] Foreign Application Priority Data

Jun. 11, 1993 [FR] France .................. 93 07064

[51] Int. Cl.⁶ .................................................. G06K 9/00
[52] U.S. Cl. ..................... 382/107; 348/142; 382/291
[58] Field of Search .......................... 382/103, 106, 382/107, 199, 216, 291, 236; 348/142, 169, 171, 172, 170, 144, 148, 149

[56] References Cited

U.S. PATENT DOCUMENTS

| | | | |
|---|---|---|---|
| 4,227,212 | 10/1980 | Woolfson et al. | 358/126 |
| 4,405,940 | 9/1983 | Woolfson et al. | 358/93 |
| 4,539,590 | 9/1985 | Gage | 358/125 |
| 4,651,341 | 3/1987 | Nakashima et al. | 382/34 |
| 5,187,777 | 2/1993 | Conboy et al. | 395/163 |
| 5,257,209 | 10/1993 | Markandey | 364/516 |

OTHER PUBLICATIONS

Hsi–Jian Lee et al., Pattern Recognition, vol. 23, No. 7, 1990, Head. Hill Hall, Oxford, GB, pp. 785–798.

*Primary Examiner*—Joseph Mancuso
*Attorney, Agent, or Firm*—Fisher, Christen & Sabol

[57] ABSTRACT

The present invention relates to a process and a device for determining the location of a target (C) observed in the field of view of an optical detector.

According to the invention, the process is notable in that:
  in a preliminary step, there are determined, at least one partial image (9, 10) of the background and one partial image (11) of the target (C); and
next:
  a picture (V1) is taken;
  at least one background search window (19) is isolated from said picture (V1);
  the partial image (9) of the background is searched for in said search window (19);
  the movement of the optical detector is determined from the position of this partial image (9);
  a target search window (26) is isolated;
  the partial image (11) of the target is searched for in said search window (26); and
  the movement of the target (C) is determined from the position of this partial image (11).

7 Claims, 5 Drawing Sheets

PROCESS AND DEVICE FOR DETERMINING THE LOCATION OF A TARGET

This application is a Continuation of prior U.S. application Ser. No. 08/257,915 filed on Jun. 10, 1994 now abandoned.

The present invention relates to a process and a device for determining the location of a target observed in the field of view of an optical detector.

Numerous weapons, in particular anti-tank weapons, use an optical detector integral with the firing post and aimed towards a target to be destroyed, for example, by way of a missile. Some weapons provide for the location and guiding of the missile along an axis which is directed continuously at the target.

Through the document EP-A-0,206,912, a system is known, for example, which includes an optical detector intended for locating a mobile body with respect to an axis perpendicular to the plane of said detector. This system can be incorporated into a weapon for the guiding of a missile along said axis perpendicular to the detector. It is then essential, in order for the missile to hit the target, that the optical detector remain continuously aimed towards the target or that reaiming can be carried out rapidly in the event that an unforeseen incident causes said optical detector to drift off-target.

It may indeed happen that said axis suddenly deviates from the target, for example, following a movement of the weapon caused by an uncontrolled motion by the user thereof. Such an uncontrolled motion can, in particular, be caused by the unballasting provoked when launching the missile.

In such an event, in order that the launched missile not miss its target, it must be possible rapidly to redefine the missile's guide axis, that is to say it must be possible to determine, within a very short time span, the location of the target with respect to the axis of the optical detector, so as to be able to implement the system described in the document EP-A-0 206 912.

The object of the present invention is to determine, in a rapid and efficient manner, the location of a target initially referenced in the field of view of an optical detector.

For this purpose, according to the invention the process for determining the location of a target observed in the field of view of an optical detector is notable in that:

in a preliminary step, a picture is taken of the field of view of the optical detector and there are determined a model of the background including at least one partial image of the background and a model of the target including a partial image of the target, as well as kinematic characteristics of the latter; and throughout the duration of determination of location, the following steps are repeated:

a current picture is taken of the field of view;

at least one background search window is isolated from said current picture;

the partial image of the background is searched for in said isolated search window;

the movement of the optical detector between the preceding picture and said current picture is determined from the position of this partial image in said search window;

a target search window is isolated from the current picture, while taking account of the calculated movement of the optical detector and the position of the target in the preceding picture;

the partial image of the target is searched for in said isolated search window;

the movement of the target with respect to the background is determined from the position of this partial image in said search window;

said calculated movement of the target is compared with two values, minimum and maximum, of movement which are determined from the kinematic characteristics of the target, in such a way that if the calculated movement is between said two values the location of the target obtained through this calculated movement is confirmed, otherwise an estimated position of the target is determined from the kinematic characteristics of the latter; and the models of the background and of the target are conditionally updated.

Consequently, location of the target is carried out in two successive steps. In effect, firstly, the movement of the optical detector between the preceding picture and the current picture is determined and, next, the position of the target is searched for, the latter having been able to move meanwhile.

Thus, this determination of location in two steps makes it possible effectively to alleviate the disadvantages related to a possible dual movement, namely significant movement of the optical detector and movement of the target.

Moreover, through the fact of searching both for the partial images of the background and for the partial image of the target, in search windows of smaller areas than the total area of the image of the field of view, the search is considerably simplified and, consequently, the search duration is, likewise, considerably reduced. Indeed, the size of these windows is defined such that the search for an image is limited to a specified duration, this duration obviously depending on the practical use envisaged of the process.

Furthermore, the models of the background and of the target include, advantageously, statistical values of specified parameters for said background and for said target. Thus, if the actual values of said parameters deviate overly from the statistical values contained in these models, there is notification of a modification of the state of the background or of the state of the target, for example a variation in illumination or a change of direction of the target, and an updating of the models can then be triggered so as to take this modification into account.

Advantageously, there is provision, on the one hand, for the partial image of the target to be restricted to a characteristic motif of the latter and, on the other hand, for the partial images of the background to be restricted to characteristic motifs of said background.

Thus, the search in the search windows is simplified, it being given that a restriction is made to small-size motifs which are however characteristic enough to be able to be referenced unambiguously.

Furthermore, advantageously, the various search windows are determined in such a way that the matching images of the background and of the target are centered in said windows. Thus, if the drift in aim is not too significant, said images are clearly present in the search windows in the off-target position of the optical detector, regardless of the direction of movement of the drift in aim.

In the event that the movement of the optical detector is very significant or that the target has been poorly located, the model of the background arising from an image compression is updated so as to determine the movement of the background from the global field of view. Once the location is confirmed or when the optical detector becomes subject to insignificant motions only, a model of the background which includes a partial image of said background is reused.

For the implementation of the process according to the invention, there is provided a device which includes:

picture-taking means capable of taking a picture of the field of view of the optical detector;

an image extraction device capable of isolating at least one partial image of the background and one partial image of the target, as well as a background search window and a target search window;

a data memory capable of recording the partial images of the background and of the target, as well as the characteristic values of specified parameters for the background and for the target;

a device for matching, receiving the information from the data memory and from the image extraction device and searching for the partial image of the background and the partial image of the target in the matching search windows;

a first calculator associated with said matching device, calculating the movement of the optical detector and the movement of the target;

a system for confirming the location of the target, comparing the calculated movement of the target with movement values determined from kinematic characteristics of the target, and capable of determining an estimation of the position of the target; and a second calculator, allowing the updating of the models of the background and of the target.

The figures of the attached drawing will clearly elucidate the manner in which the invention may be embodied. In these figures, identical labels denote similar elements.

Figure 1:
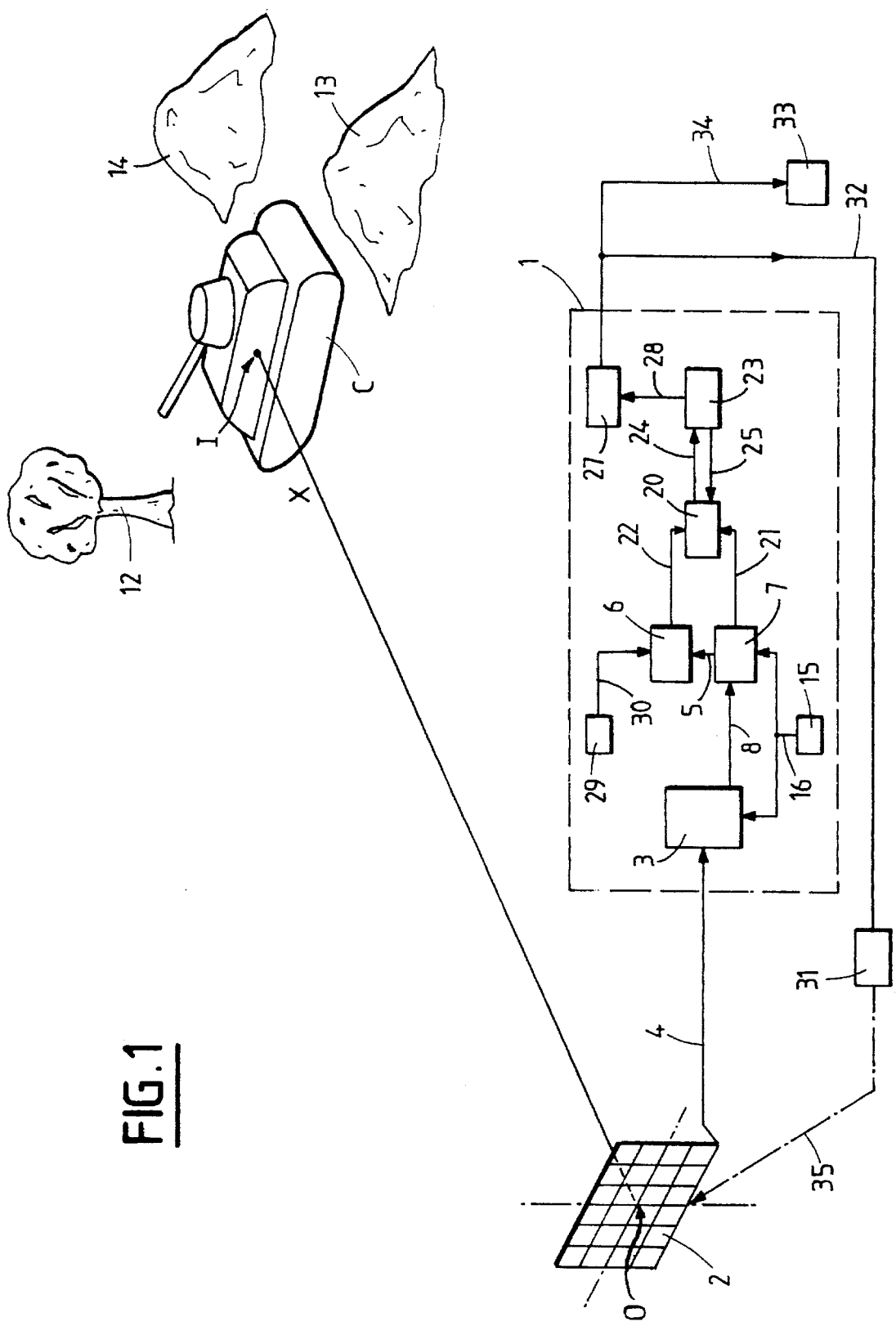
FIG. 1 shows an optical detector, with which is associated a device according to the invention, which optical detector is aimed towards a target.

The device 1, according to the present invention and represented by its schematic diagram in FIG. 1, is intended for determining the location of a target C observed in the field of view of an optical detector 2.

Initially, said optical detector 2 is aimed, as represented in FIG. 1, towards said target C, along an axis OX (directed at a point I of the target C) which represents, for example, the line of sight of an anti-tank weapon (not represented) equipped with said optical detector 2.

Figure 2:
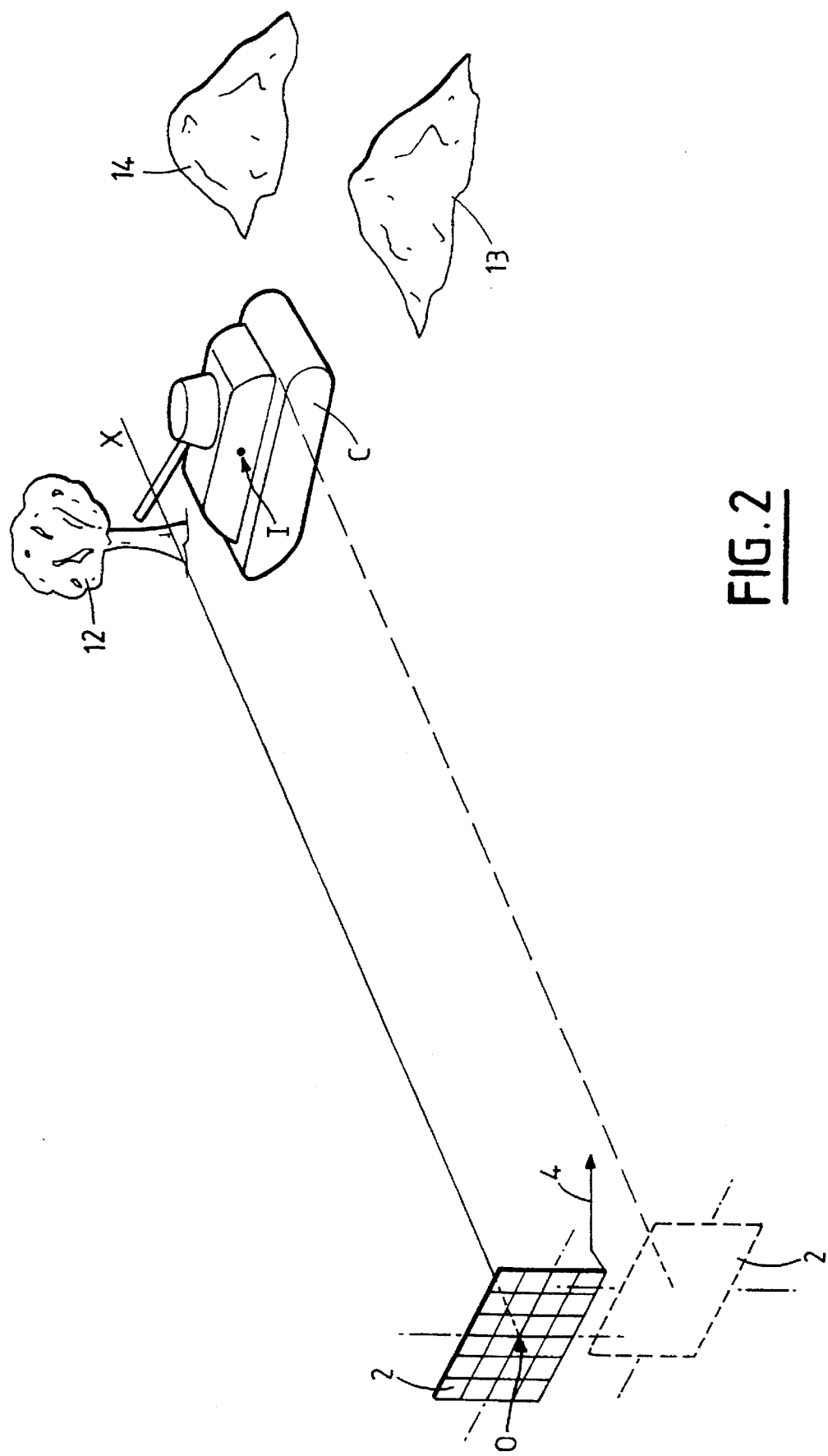
FIG. 2 shows the optical detector of FIG. 1 at a later instant, in an off-target position.

It may happen that an unforeseen incident or a maneuver imperfectly executed by the user of the weapon (for example when launching a missile) induces a drifting of this axis OX from the target C, as represented in FIG. 2. In such an event, the device 1 according to the invention is used to determine rapidly the location of the target C, more precisely to determine the position of the point I thereof.

Said device 1 includes picture-taking means 3 linked by way of a link 4 to the optical detector 2 and capable of taking a picture of the field of view of the latter. The picture-taking means 3 and the optical detector 2 linked together constitute, for example, a visible or infrared camera.

Figure 3:
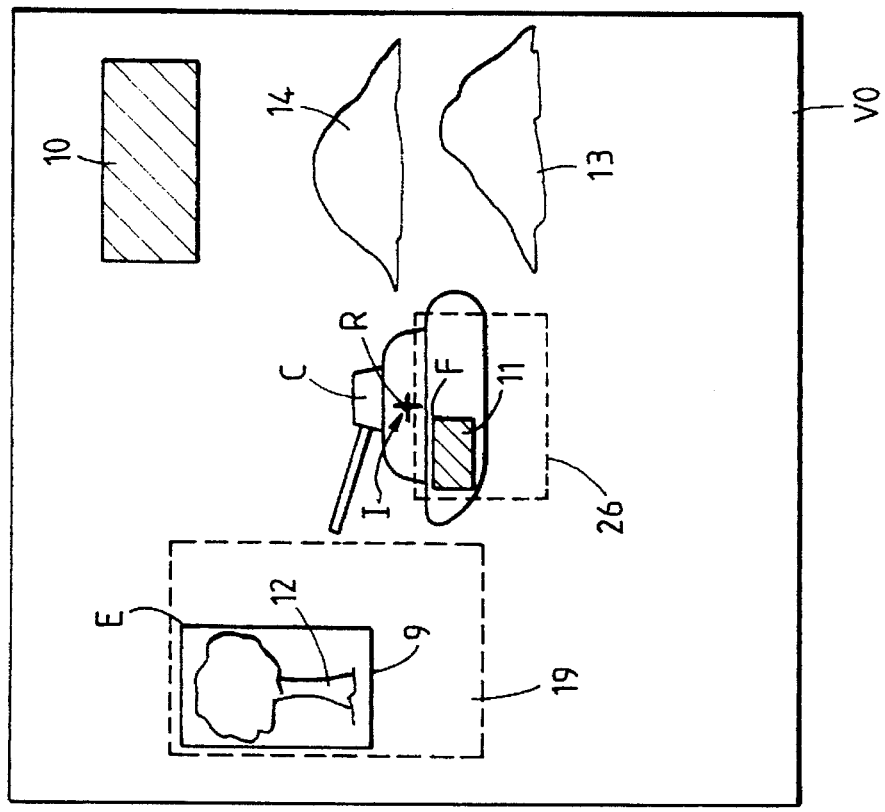
FIG. 3 illustrates the field of view of the optical detector in the position of FIG. 1.

In FIG. 3 is represented an image V0 of the field of view for an on-target position of said optical detector 2, corresponding to the position represented in FIG. 1.

The target C is substantially centered in this image V0. A cross-hair R determining the center of the field of view and corresponding to the direction of the OX axis is superimposed on the image of the target C, around the point I.

An image extraction device 7 analyzes this image V0 which is relayed to it via a link 8. It determines within this image V0, as represented in FIG. 3, partial images 9 and 10 of the background and an image 11 of the target C. The image of the target can be either partial, such as the image 11 represented, or total. In order to represent such an image, several solutions are possible. Use may be made, for example, of matrices of pixels, segments generated by polygonal approximation of the outline or Fourier descriptors of the outline. For the purpose of illustration, an element of the environment 12 corresponding to the partial image 9 of the background, as well as elements of the environment 13 and 14, have been represented in the image V0.

The image extraction device 7 relays these results, by way of a link 5, to a data memory 6 which records the various determined partial images 9, 10 and 11. Said data memory 6 also records statistical values of specified parameters for the background and for the target, as well as kinematic characteristics of the target. The preliminary step, described previously, is therefore intended for recording models of the background and of the target, including at one and the same time partial images, statistical values and kinematic characteristics.

Figure 5:
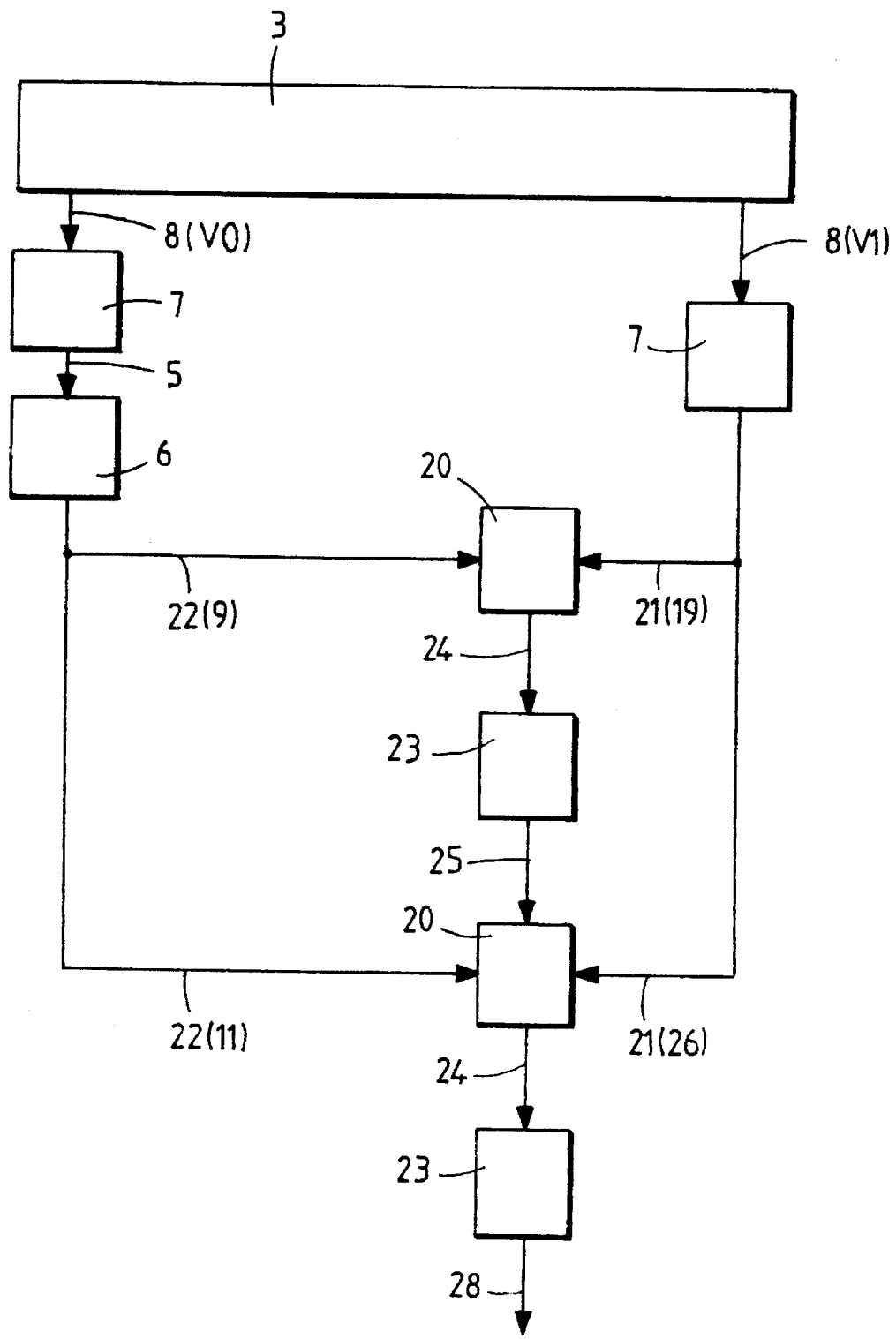
FIG. 5 shows, diagrammatically, various successive steps for determining the location of a target.

The device 1 according to the invention for determining the location of the target C is triggered by a triggering element 15 which includes a time base (not represented) and which simultaneously triggers, by way of a link 16, the picture-taking means 3 and the image extraction device 7. This triggering is carried out at regular time intervals, for example every 40 ms, so as to be able continuously to repeat, after each triggering, the various successive steps described below for locating the target C. These successive steps are, furthermore, represented diagrammatically in FIG. 5. The labels between parentheses in this FIG. 5 correspond to the labels of the information relayed by the various links concerned.

a) When they are triggered, the picture-taking means 3 take an image V1 (represented in FIG. 4) of the field of view of the optical detector 2 in the (off-target) position of FIG. 2 (furthermore represented in this FIG. 2, with dashed lines, is said optical detector in its position of FIG. 1, that is to say in the last position in which the target was located) and relay it to the image extraction device 7 via the link 8.

b) This image extraction device 7 isolates, in said image V1, a background search window 19 in which one 9 of the partial images of the background as previously recorded by the data memory 6 is assumed to lie.

c) A matching device 20 receives, on the one hand, information relating to said background search window 19 via a link 21 and, on the other hand, information relating to the partial image 9 recorded in the data memory 6 via a link 22.

Figure 4:
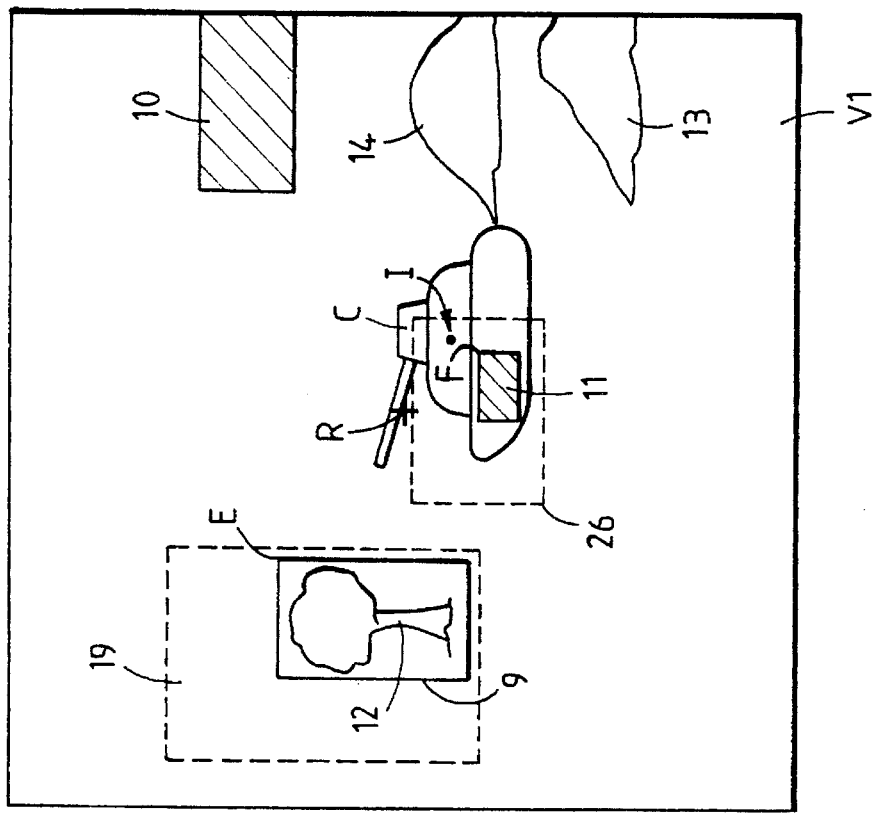
FIG. 4 illustrates the field of view of the optical detector in the position of FIG. 2.
Figure 6:
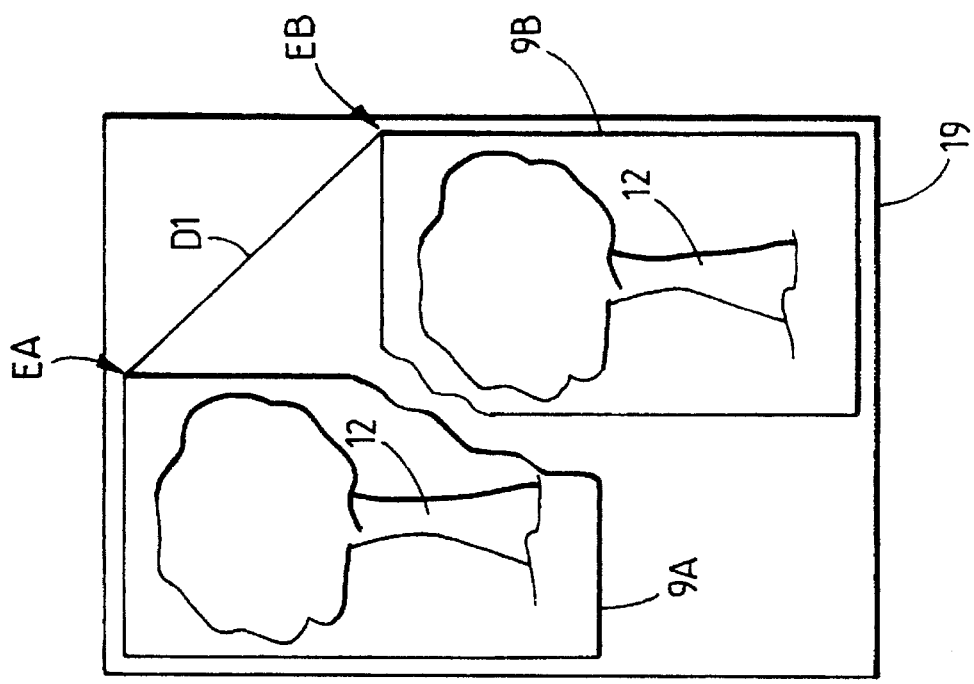
FIG. 6 illustrates the principle for calculating the movement of the optical detector.

Said matching device 20 then searches in the search window 19, as represented in FIG. 6, for the position 9B of the partial image 9 of the background, corresponding to the situation represented in FIG. 4. It communicates the result obtained, via a link 24, to a calculator 23 which is associated therewith.

d) The calculator 23, knowing this position 9B of the partial image 9 in the window 19 and the position 9A in the state of the last position in which the target was located (FIG. 3), determines the distance D1 of a same point E of the partial image 9, between its position EA in the state of the last position in which the target was located and its position EB in the off-target state, and it communicates this distance D1 to the matching device 20 via a link 25.

This distance D1 corresponds to the movement of the optical detector 2 between the positions represented in FIGS. 1 and 2 respectively. In the event that the target C has also moved, a knowledge of D1 is not sufficient to retrieve directly the position of the point I sought. It is necessary, in fact, to determine moreover the movement of the target with respect to the background.

Figure 7:
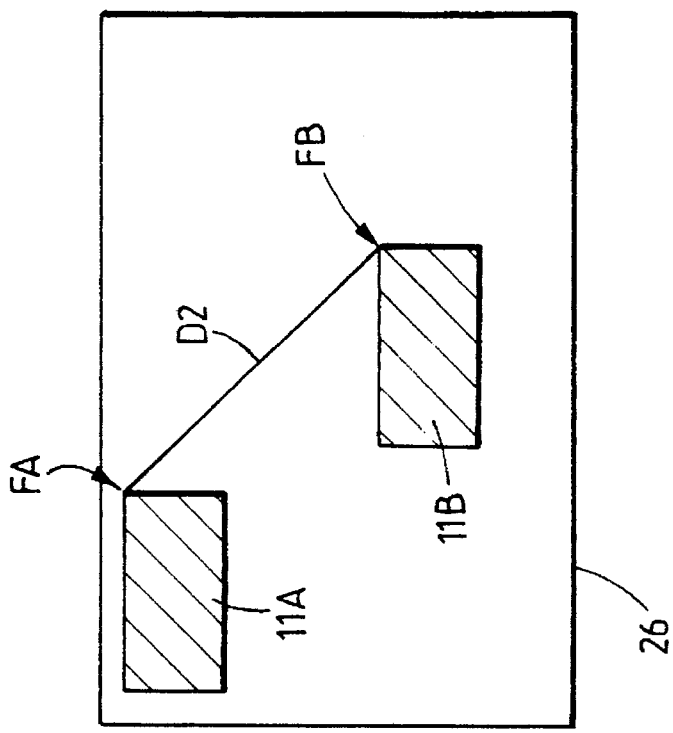
FIG. 7 illustrates the principle for calculating the movement of the target.

To this end, the steps described below are carried out.

e) The image extraction device 7 isolates within the image V1, while taking into account the calculated movement D1 and the position of the target C in the image V0, a target search window 26 in which the partial image 11 of the target C, recorded by the data memory 6, is assumed to lie.

f) With the aid of the information received regarding, at one and the same time, the partial image 11 of the target C and the target search window 26, the matching device 20 searches in said window 26 for the position 11B of the partial image 11 of the target C in the (off-target) state of FIG. 4 and it communicates this position to the calculator 23.

g) Said calculator 23, knowing this position 11B, as well as the position 11A of the partial image 11 of the target with respect to the window 26 in the state of the last position in which the target was located (FIG. 3), determines the distance D2 of a same point F of the partial image 11, between its position FA in the state of the last position in which the target was located and its position FB in the off-target state, such as represented in FIG. 7. The distance D2 corresponds to the movement made by the target C.

h) Said calculator 23 relays this information to a system 27 for confirming the location of the target, by way of a link 28. This confirming system 27 compares the calculated movement D2 of the target C with two values, minimum and maximum, of movement which are determined from the kinematic characteristics of the target C (which the data memory 6 has relayed to it by way of a link not represented). If the calculated movement D2 is between said two values, the confirming system 27 confirms the location of the target C obtained from this movement D2. Otherwise, it determines, for example by means of a Kalman filter, an estimated position of the target C calculated from the kinematic characteristics.

i) From the data relating to this new position of the target C, a calculator 29 updates the models of the background and of the target and relays them to the data memory 6 by way of a link 30.

These various steps a to i are carried out after each triggering operated at regular time intervals by the triggering element 15. The device 1 according to the invention thus allows continuous determination of the location of the target C.

As mentioned previously, the models of the background and of the target include statistical values of specified parameters for said background and for said target. According to one mode of operation (not represented) of the invention, a sufficient but not overly significant variation in some of these parameters with respect to the recorded statistical values triggers automatic updating of the models, thus enabling for example a change of direction of the target or a modification in illumination to be taken into account.

According to the embodiment, the confirming system 27 communicates the position of the target C, either to a control system 31 by way of a link 32, or to a display device 33 by way of a link 34. The control system 31 is linked to the optical detector 2 by a link 35 and enables the detector to be reaimed automatically once it knows the result relayed by the confirming system 27. On the other hand, the display device 33 communicates the result to the user of the device 1, who may then move the optical detector 2, either manually, or by operating a special positioning element (not represented).

It will be noted that the matching device 20 is capable of determining the position 9B of the partial image 9 of the background in the search window 19 or the position 11B of the partial image 11 of the target in the search window 26, even in the event that only a part of these partial images appears in said matching windows.

The device 1 according to the invention can be embodied at least in part in the form of a processor board.

We claim:

1. A process for determining the location of a target (C) observed in the field of view of an optical detector (2), wherein:

(I) in a preliminary step, a picture (V0) is taken of the field of view of the optical detector (2) and there are determined a model of the background including at least one partial image (9, 10) of the background and a model of the target including a partial image (11) of the target, said partial images (9, 10, 11) being stored as templates, as well as kinematic characteristics of the latter; and (II) throughout the duration of determination of location, the following steps are repeated:

(a) a current picture (V1) is taken of the field of view;

(b) the movement of the optical detector (2) is calculated in a first main step that includes the following stages:

(i) at least one background search window (19), having the same size within every picture and located at the same position on every picture until the position of said at least one background search window on said current picture is changed, is isolated from said current picture (V1);

(ii) the isolated background search window (19) is scanned to match the partial image (9) of the background stored as a template and a subarea of the isolated background search window (19);

(iii) the movement (D1) on a picture coordinates plane of the optical detector (2) between point in time a preceding picture is taken and point in time of said current picture is taken is calculated from the position of the partial image (9) of the background in said background search window (19);

(c) the movement of the target (C) is calculated in a second main step that includes the following stages:

(iv) a target search window (26) having the same size within every picture is isolated from the current picture (V1), the location of this target search window depending on the calculated movement of the optical detector and the position of the target in the preceding picture;

(v) the isolated target search window (26) is scanned to match the partial image (11) of the target stored as a template and a subarea of the isolated target search window (26);

(vi) the movement (D2) of the target (C) on the picture coordinates plane that includes the movement of the optical detector is calculated from the position of the partial image (11) of the target in said target search window (26);

(d) said calculated movement (D2) of the target (C) is compared with two values, minimum and maximum, of movement which are determined from the kinematic characteristics of the target (C), in such a way that if the calculated movement (D2) is between said two values the location of the target (C) obtained through this calculated movement (D2) is confirmed, otherwise an estimated location of the target is determined from the kinematic characteristics of the latter; and (f) the models of the background and of the target are updated.

2. The process as claimed in claim 1, wherein the models of the background and of the target include quantities computed from sample or samples of specified parameters for said background and for said target.

3. The process as claimed in claim 1, wherein the partial image (11) of the target (C) is restricted to a characteristic motif of the latter.

4. The process as claimed in claim 1, wherein the partial image (9, 10) of the background is restricted to a characteristic motif of said background.

5. The process as claimed in claim 1, wherein the background search window is determined in such a way that the partial image of the background is centered in said window.

6. The process as claimed in claim 1, wherein the target search window is determined in such a way that the partial image of the target is centered in said window.

7. A device (1) for the implementation of the process specified in claim 1, wherein it includes:

I picture-taking means (3) capable of taking a picture (V0, V1) of the field of view of the optical detector (2);

II an image extraction device (7) capable of isolating at least one partial image (9, 10) of the background and one partial image (11) of the target, as well as a background search window (19) and a target search window (26);

III a data memory (6) capable of recording the partial images of the background and of the target, as well as the characteristic values of specified parameters for the background and for the target;

IV a device for matching (20), receiving the information from the data memory (6) and from the image extraction device (7) and searching for the partial image (9) of the background and the partial image (11) of the target in the matching search windows (19, 26);

V a first calculator (23) associated with said matching device (20), calculating the movement (D1) of the optical detector (2) and the movement (D2) of the target (C);

VI a system (27) for confirming the location of the target, comparing the calculated movement (D2) of the target (C) with movement values determined from kinematic characteristics of the target (C), and capable of determining an estimation of the position of the target (C); and VII a second calculator (29), allowing the updating of the models of the background and of the target.

* * * * *